No. 719,813. PATENTED FEB. 3, 1903.
J. KING.
BRAKE MECHANISM.
APPLICATION FILED OCT. 30, 1902.
NO MODEL. 2 SHEETS—SHEET 1.
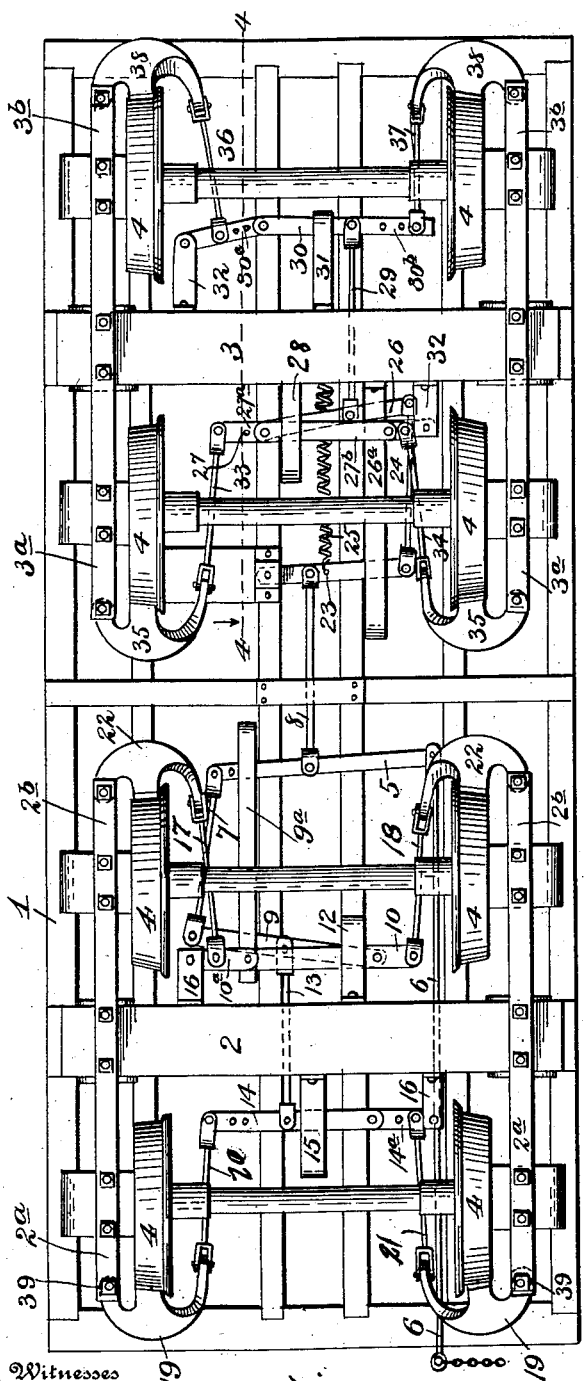
Witnesses
F. L. Ourand
J. D. Willson
Inventor
John King.
By H. B. Willson & Co.
Attorneys No. 719,813. PATENTED FEB. 3, 1903.
J. KING.
BRAKE MECHANISM.
APPLICATION FILED OCT. 30, 1902.
NO MODEL. 2 SHEETS—SHEET 2.
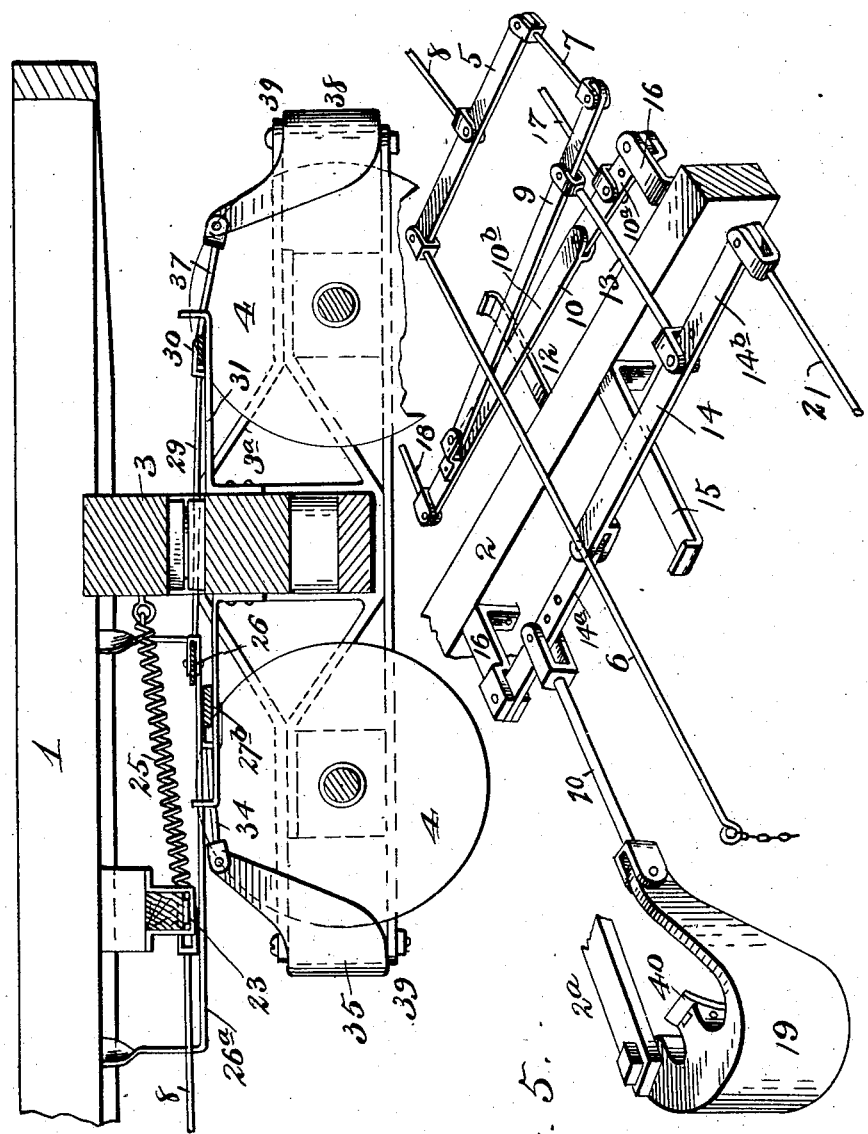
Witnesses
F. L. Ourand
O. R. Willson
Inventor
John King.
By H. B. Willson & Co.
Attorneys

UNITED STATES PATENT OFFICE.

JOHN KING, OF DETROIT, MICHIGAN, ASSIGNOR OF TWO-THIRDS TO WILLIAM D. TOTTEN, OF DETROIT, MICHIGAN.

BRAKE MECHANISM.

SPECIFICATION forming part of Letters Patent No. 719,813, dated February 3, 1903.

Application filed October 30, 1902. Serial No. 129,446. (No model.)

*To all whom it may concern:*

Be it known that I, JOHN KING, a citizen of the United States, residing at Detroit, in the county of Wayne and State of Michigan, have invented certain new and useful Improvements in Brake Mechanism; and I do declare the following to be a full, clear, and exact description of the invention, such as will enable others skilled in the art to which it appertains to make and use the same.

This invention relates to improvements in braking mechanism for railway-cars and other wheeled vehicles.

The object is to produce such a braking mechanism whereby the usual brake-beam is dispensed with and a simpler arrangement of levers and rods is employed than in the customary construction of brake mechanism and a more efficient braking action is derived.

A further object is to arrange and support the parts whereby the brake-heads may be quickly and readily swung into position for renewal of their brake-shoes or to afford ready access to the car-trucks for insertion or removal of wheels, &c.

With these and other objects in view the invention consists in the combination and arrangement of the parts, as will be hereinafter more fully described and claimed, reference being had to the accompanying drawings, in which—

Figure 1 is a bottom plan view of a railway-car, showing the application of the braking mechanism. Fig. 2 is a side elevation of one of the car-trucks, showing the manner of supporting the brake-heads. Fig. 3 is an elevation of one end of the car platform and trucks. Fig. 4 is a longitudinal vertical section through the mechanism at one end of the car on line 4 4. Fig. 5 is a detail perspective view of one of the brake-heads.

In the drawings, 1 denotes the platform or bed of a car. 2 denotes the truck at one end of the car; 3, the truck at the opposite end, and 4 denotes the car-wheels. These parts may be of the ordinary or well-known construction.

5 denotes a floating lever arranged at some point between the car-trucks and supported in a bracket depending from the framework of the car. To one end of the lever 5 is connected the inner end of an operating-rod 6. To the opposite end of said lever is pivotally connected a rod or link 7, while about midway the lever is connected a rod 8. To the opposite end of the rod or link 7 is pivotally connected one end of a lever 9, which is supported by a hanger 9ª and is connected at its opposite end to a brake-lever 10, arranged adjacent to the inner side of the truck 2 and supported by a bracket-arm 12, projecting inwardly from said truck.

13 denotes a rod or link having a pivotal connection with the lever 9. The rod or link 13 projects through to the opposite side of the truck 2 and has pivoted thereto a brake-lever 14, which is supported by a bracket-arm 15, projecting from the outer side of the truck 2. The brake-levers 10 and 14 are each formed in two sections, short sections 10ª and 14ª and long sections 10ᵇ and 14ᵇ, the sections of each lever being pivoted together. The free ends of the short sections are fulcrumed in brackets 16, projecting from each side of the truck 2.

17 denotes a brake-rod having an adjustable connection with the short section 10ª of the brake-lever 10, and 18 denotes a brake-rod having an adjustable connection with the long section 10ᵇ of the lever 10, and to the opposite ends of the brake-rods 17 and 18 are pivotally connected brake-heads 19 of the inner wheels on truck 2.

20 and 21 denote similar brake-rods adjustably connected, respectively, to the short and long sections 14ª and 14ᵇ of the brake-lever 14, arranged at the outer side of the truck 2. To the opposite ends of the rods 20 and 21 are pivotally connected brake-heads 22, which are adapted to engage the outer wheels of the truck 2.

The mechanism for braking the wheels of truck 3 is similar to that of truck 2 and is described as follows: As hereinbefore stated, the floating lever 5 has pivotally connected therewith, about midway the length thereof, the rod 8. The opposite end of this rod is pivotally connected to an auxiliary lever 23 near the fulcrum end of the same, the said end of the lever being fulcrumed to a portion of the framework of the car-platform. To the opposite end of the lever 23 is connected one end of a link or rod 24, and at a point in said lever in juxtaposition to the connection of the rod 8 is connected one end of a coil-spring 25, the opposite end of which is connected to the framework of the car-platform. The tendency of the spring is exerted upon the braking mechanism to release the brake-heads from the wheels. To the free end of the rod or link 24 is connected one end of a lever 26, which is supported by a hanger 26ª, and is connected at its opposite end to a brake-lever 27, arranged adjacent to the inner side of the truck 3 and supported by a bracket-arm 28 projecting from said truck.

29 denotes a rod or link having a pivotal connection with the lever 26, at about the center thereof, and projects through to the opposite side of the truck 3 and has pivoted thereto a brake-lever 30, which is supported by a bracket-arm 31 projecting from the outer side of the truck 3.

The brake-levers 27 and 30 are each formed in two sections, short sections 27ª and 30ª and long sections 27ᵇ and 30ᵇ, the sections of each lever being pivoted together. The free ends of the short sections are fulcrumed in brackets 32, projecting from each side of the truck 3.

33 denotes a brake-rod having an adjustable connection with the short section 27ª of the brake-lever 27, and 34 denotes a brake-rod having an adjustable connection with the long section 27ᵇ of the lever 27, and to the opposite ends of the brake-rods 33 and 34 are pivotally connected brake-heads 35 of the inner wheels of truck 3.

36 and 37 denote similar brake-rods adjustably connected, respectively, to the short and long sections 30ª and 30ᵇ of brake-lever 30, arranged at the outer side of the truck 3. To the opposite ends of the rods 36 and 37 are pivotally connected brake-heads 38, which are adapted to engage the outer wheels of the truck 3.

The free ends of the brake-heads 19, 22, 35, and 38 are each pivoted, as at 39, between the longitudinally-extended ends of the truss-bars 2ª, 2ᵇ, 3ª, and 3ᵇ of trucks 2 and 3, respectively, and are adapted to be swung on these pivotal connections into and out of engagement with the wheels of said trucks by the system of levers and rods hereinbefore described.

The engaging faces of each of the brake-heads are recessed to receive the shanks of brake-shoes 40, which are held in place by means of a pin or bolt passing downwardly through alined holes or openings formed in the heads and in the engaging shanks of the shoes.

The free end of the operating-rod 6 may be connected by a chain (not shown) to the shaft of an ordinary brake-wheel for manual operation, or said rod may be connected to the piston-rod of an air-brake cylinder and be operated by air or other fluid pressure.

It will be seen that upon power being applied to the operating-rod 6 the floating lever 5 is rocked, which in turn operates all the other levers through the medium of the connecting-rods to simultaneously apply all the brake-heads to the wheels and upon the release of the operating-rod the coil-spring 25 will retract the parts to their normal positions and relieve the pressure of the brake-heads on the wheels.

From the foregoing description, taken in connection with the accompanying drawings, the construction and operation of the several parts will be readily understood without requiring a further description, and while I have shown and described the same in connection with a railway-car it is obvious that the mechanism may be applied to other vehicles with slight modifications of structure.

Various changes in the form, proportion, and the minor details of construction may be resorted to without departing from the principle or sacrificing any of the advantages of this invention.

Having thus described my invention, what I claim as new, and desire to secure by Letters Patent, is—

In a braking mechanism for railways-cars and other vehicles, the combination with a car-bed frame having wheel-trucks and wheels carried by said trucks, of brake-heads hinged between the extended ends of the truss bars or plates of said wheel-trucks, a floating lever having one end connected to an operating-rod, two-part brake-levers arranged on each side of the wheel-trucks, each having one end fulcrumed in a bracket carried by said trucks, brake-rods connecting said levers near each end thereof with said brake-heads, rods and levers connecting said brake-levers together and to said floating lever at one end of said car, and rods and levers connecting said brake-levers together and to an auxiliary lever at the opposite end of said car, a coil-spring connecting said auxiliary lever to the car-frame and a rod or link connecting said floating lever and said auxiliary lever, substantially as set forth.

In testimony whereof I have hereunto set my hand in presence of two subscribing witnesses.

JOHN KING.

Witnesses:
 WM. D. TOTTEN,
 JOHN R. FISHER.